United States Patent
Rausch et al.

(10) Patent No.: US 10,476,296 B1
(45) Date of Patent: Nov. 12, 2019

(54) SUPPLEMENTING ENERGY STORAGE OF AN IN-FLIGHT SOLAR-POWERED UAV BY CASTING LIGHT FROM A SECONDARY IN-FLIGHT UAV

(71) Applicant: Sprint Spectrum L.P., Overland Park, KS (US)

(72) Inventors: Walter F. Rausch, Shawnee, KS (US); Guenther Ottendorfer, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 260 days.

(21) Appl. No.: 15/637,214

(22) Filed: Jun. 29, 2017

(51) Int. Cl.
*H02J 7/00* (2006.01)
*H02J 7/35* (2006.01)
*B64C 39/02* (2006.01)
*H02S 40/38* (2014.01)
*H02S 20/30* (2014.01)
*H02S 40/22* (2014.01)

(52) U.S. Cl.
CPC ............ *H02J 7/355* (2013.01); *B64C 39/024* (2013.01); *H02S 20/30* (2014.12); *H02S 40/22* (2014.12); *H02S 40/38* (2014.12); *B64C 2201/042* (2013.01); *B64C 2201/066* (2013.01); *B64C 2201/12* (2013.01); *B64D 2211/00* (2013.01)

(58) Field of Classification Search
CPC ....................................................... H02J 7/355
USPC ........................................................ 320/101
See application file for complete search history.

(56) References Cited

U.S. PATENT DOCUMENTS

| | | | |
|---|---|---|---|
| 6,908,702 B2* | 6/2005 | McElroy | B64C 39/024 244/30 |
| 9,650,138 B2* | 5/2017 | Yates | B64D 33/00 |
| 10,040,561 B2* | 8/2018 | Frolov | B64D 41/007 |
| 2004/0092258 A1* | 5/2004 | Hibbs | H04B 7/18504 455/431 |
| 2010/0213309 A1* | 8/2010 | Parks | B64C 3/16 244/46 |
| 2016/0009402 A1* | 1/2016 | Hunter | B64D 27/24 244/53 R |
| 2016/0288918 A1* | 10/2016 | Yates | B64D 39/00 |
| 2016/0311545 A1* | 10/2016 | Parks | B64C 5/02 |
| 2017/0203850 A1* | 7/2017 | Wang | B64C 39/024 |
| 2017/0320569 A1* | 11/2017 | Gordon | B64C 39/024 |
| 2018/0141657 A1* | 5/2018 | Han | B64C 39/02 |
| 2018/0281945 A1* | 10/2018 | Needham | B64C 39/024 |
| 2018/0324662 A1* | 11/2018 | Phuyal | H04B 7/15507 |
| 2019/0009916 A1* | 1/2019 | Von Novak | B64D 27/24 |
| 2019/0047698 A1* | 2/2019 | Jassowski | B64C 39/024 |
| 2019/0077510 A1* | 3/2019 | Panas | H04W 4/02 |

(Continued)

*Primary Examiner* — Suchin Parihar

(57) ABSTRACT

A secondary UAV flies over the solar-powered UAV at night and illuminates the solar-powered UAV's solar panels to help supplement the solar-powered UAV's battery charge mid-flight. The secondary UAV could be equipped with a directional light source for providing light of a color and intensity selected for optimal absorption by the solar cells of the solar-powered UAV. As the secondary UAV flies over the solar-powered UAV, the secondary UAV could thus direct its light source at the solar-powered UAV for absorption by the solar cells, to help supplement the solar-powered UAV's battery charge. Further, the secondary UAV could potentially recharge multiple solar-powered UAVs during a single nighttime mission.

20 Claims, 6 Drawing Sheets

(56) References Cited

U.S. PATENT DOCUMENTS

2019/0144112 A1\* 5/2019 Jaugilas ................ B64C 39/024
 244/75.1
2019/0146512 A1\* 5/2019 Sindlinger ........... G05D 1/0217
 701/26
2019/0152605 A1\* 5/2019 Tillotson .................. B64D 5/00
2019/0183077 A1\* 6/2019 Ajamian ................ A01H 1/025

\* cited by examiner

SUPPLEMENTING ENERGY STORAGE OF AN IN-FLIGHT SOLAR-POWERED UAV BY CASTING LIGHT FROM A SECONDARY IN-FLIGHT UAV

BACKGROUND

Recent years have seen increased interest in solar-powered unmanned aerial vehicles (UAVs), such as drones and balloons, for a variety of uses including surveillance, climate analysis, forest fire tracking, mapping, and telecommunications, among others. These advanced UAVs are equipped with solar panels and rechargeable batteries, allowing them to stay aloft and in service for potentially months or years at a time. Further, some such UAVs could be flown in the stratosphere, offering many of the advantages of traditional satellites but at a fraction of the cost.

By way of example, a representative "high altitude pseudo-satellite" or "HAPS platform" is a lightweight drone equipped with solar cells spread across its wings and with high-power lithium-sulphur batteries and propellers. Controlled from the ground or flying autonomously, the HAPS platform could climb to an altitude of around 70,000 feet (about 21 kilometers), which is above the weather and other air traffic but far below most satellites, and could carry mission payload such as high-resolution imaging and high-bandwidth communication equipment. During the day, the HAPS platform could use its solar panels to recharge its batteries. And at night, the platform could use the energy stored in its batteries to stay in flight.

OVERVIEW

One of the challenges of operating a solar-powered UAV for long stretches of time is energy storage. In particular, a key issue impacting endurance is what happens in the dark, when the UAV's photovoltaic cells do not receive sunlight to generate power and when the UAV needs to rely exclusively on its limited stored battery power. Further, this issue could be exacerbated at high altitudes, where there is less air to help keep a UAV aloft, and at high latitudes (farther from the equator), where hours of available sunlight are shorter.

One approach that has been suggested to address this issue is to have the solar-powered UAV climb during the day using power from its solar panels and descend gradually at night to save battery power. Unfortunately, however, this solution could be problematic, as the UAV could descend into commercial airspace or spend too much time during the day returning to its operational height.

Another possible solution is to allow the UAV's batteries to discharge to a greater extent while the UAV stays at its operational height at night, and to then rely on sunlight to recharge the batteries during the day. Given existing battery technology, however, this approach could be costly. In particular, especially at high latitudes, this approach could cause the UAV's batteries to discharge beyond their recommended discharge tolerances, which could significantly reduce their serviceable lifetime. As a result, it could become necessary for the UAVs to land as often as every thirty days or so for expensive battery replacements.

Disclosed herein is an improved method and system to help address these issues. In accordance with the disclosure, a secondary UAV would fly over the solar-powered UAV at night and would illuminate the solar-powered UAV's solar panels to help supplement the solar-powered UAV's battery charge. In particular, the secondary UAV could be equipped with a directional light source for providing light of a color and wattage or intensity selected for optimal absorption by the solar cells of the solar-powered UAV. As the secondary UAV flies over the solar-powered UAV, the secondary UAV could thus direct its light source at the solar-powered UAV for absorption by the solar cells, to help supplement the solar-powered UAV's battery charge. Further, depending on the recharge time deemed necessary for the solar-powered UAV, the secondary UAV could potentially recharge multiple solar-powered UAVs during a single nighttime mission.

Accordingly, in one respect, disclosed is a method of charging an energy-storage device (e.g., a battery) of a first UAV while the first UAV is in flight, where the first UAV is equipped with solar cells that convert light into electricity for charging the energy-storage device. As disclosed, the method includes flying a second UAV in proximity to the first UAV while the first UAV is in flight, the second UAV being equipped with a directional light source. And the method includes, while the second UAV is flying in proximity to the first UAV in flight, using the directional light source to cast light onto the solar cells of the first UAV to help charge the energy-storage device of the first UAV.

In another respect, disclosed is a method of charging a battery of a first aircraft (e.g., UAV) in flight at night, where the first aircraft is equipped with solar cells that convert light into electricity for charging the battery. As disclosed, the method includes flying a second aircraft (e.g., UAV) in proximity to the first aircraft when the first aircraft is in flight at night. And the method includes, while flying the second aircraft in proximity to the first aircraft when the first aircraft is in flight at night, (i) shining an incoherent light from the second aircraft onto the solar cells of the first aircraft for conversion of the incoherent light by the solar cells into electricity for charging the battery and (ii) tracking a position of the first aircraft in relation to a position of the second aircraft and, based on the tracking, dynamically adjusting direction of the incoherent light to continue to shine the incoherent light onto the solar cells of the first aircraft for conversion of the incoherent light by the solar cells into electricity for charging the battery.

Further, in still another respect, disclosed is a system for charging a battery of a first UAV while the first UAV is in flight, where the first UAV is equipped with solar cells that convert light into electricity for charging the battery. As disclosed, the system includes a second UAV equipped with a directional light source. Further, the system includes a controller, such as a ground-based controller or a controller integrated with the second UAV, for controlling the flight and light of the second UAV. In particular, the controller is configured (i) to cause the second UAV to fly in proximity to the first UAV while the first UAV is in flight and (ii) while the second UAV is flying in proximity to the first UAV in flight, to cause the directional light source to cast incoherent light onto the first UAV for conversion of the light by the solar cells into electricity for charging the battery.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Features of the present disclosure can be applied to facilitate supplementing the battery charge of an in-flight solar-powered UAV by illuminating the UAV's solar cells with light from a secondary in-flight UAV. In practice, each of these UAVs could take various forms, including without limitation a drone, a balloon, or another type of aircraft now known or later developed, and the disclosed process could take place in flight at any altitude. In a representative implementation, for instance, the in-flight solar-powered UAV could be a HAPS drone flying in the stratosphere, and the secondary in-flight UAV could be another drone flying in the stratosphere proximate to the solar-powered HAPS drone and shining one or more flood lights on the solar cells of the HAPS drone to facilitate supplementing the HAPS drone's battery charge.

It will be understood, however, that the disclosed principles could extend to apply in other scenarios, such as to facilitate supplementing the charge of other types of energy-storage devices of an in-flight solar-powered UAV, and with respect to other types of UAVs and at other altitudes. Further, numerous other variations from the details disclosed may be possible. For instance, elements, arrangements, and operations may be added, removed, combined, distributed, or otherwise modified. In addition, operations described as being performed by one or more entities may be implemented in various ways, such as by a processing unit executing program instructions for instance.

Figure 1A:
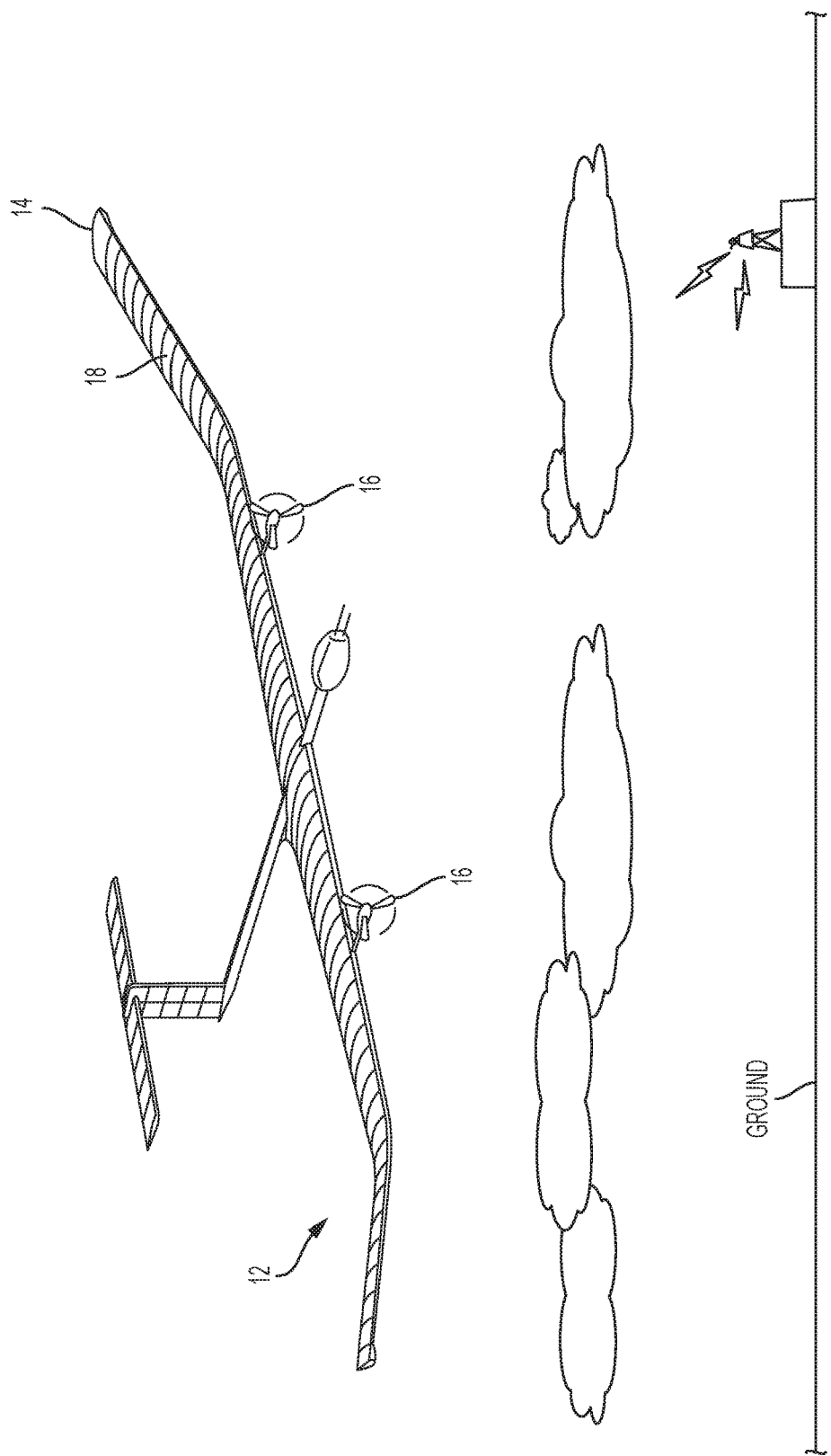
FIG. 1A is an illustration of a representative solar-powered UAV that could benefit from having its battery charge supplemented in accordance with the present disclosure.
Figure 1B:
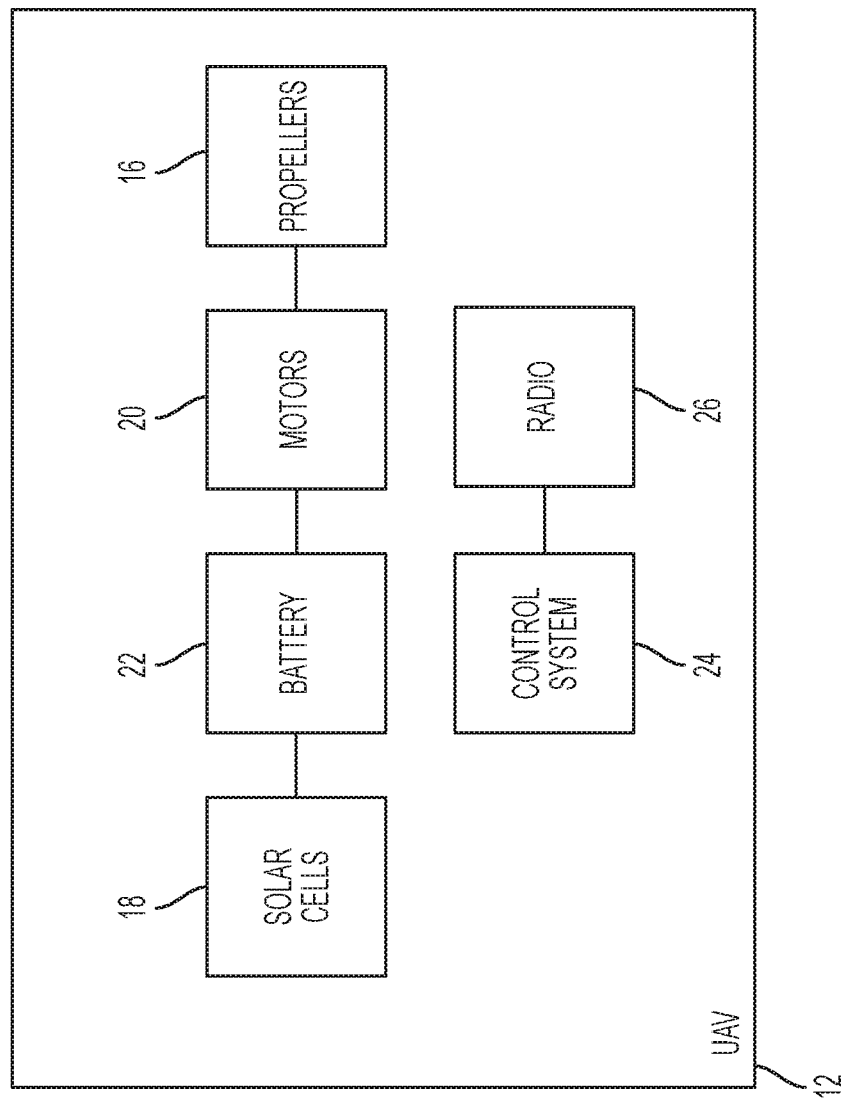
FIG. 1B is a simplified block diagram of the representative solar-powered UAV of FIG. 1A.

As noted above, FIG. 1A is an illustration of a representative solar-powered UAV 12 that could benefit from having its battery charge supplemented in accordance with the present disclosure, and FIG. 1B is a simplified block diagram showing some of the components of UAV 12. The representative UAV 12 is a drone having lightweight glider configuration that supports high-altitude, low-speed operation. For instance, the UAV might weigh around 100 to 350 pounds, have a wingspan of 80 to 115 feet, and support operation at up to 70,000 feet, with a speed of around 20 to 25 miles per hour.

As shown, the representative UAV 12 has wings 14 and propellers 16, and the UAV is equipped with solar panels 18 disposed across the top surface of its wings and tail rudder. Further, as shown in dashed lines, the UAV then includes one or more motors 20 for driving its propellers 16, so as to propel the UAV and thereby establish air flow and associated lift. And the UAV includes a battery 22 for powering the motors and perhaps other avionics and payload, a control system 24 for controlling operation of the UAV, and a radio 26 for communicating with a ground-based control center and perhaps with other aircraft.

The solar panels 18 could comprise an array of solar cells configured to convert sunlight or artificial light directly into electricity through use of the photovoltaic effect. These solar cells could take any of a variety of forms now known or later developed, include without limitation silicon, monocrystalline, polycrystalline, and thin-film solar cells. And the solar panels 18 could be coupled directly or indirectly with battery 22 to supply electricity for charging the battery in a known manner, so as to facilitate powering the motors 20 and perhaps other equipment.

The battery 22 could then comprise one or more rechargeable batteries, such as a bank of multiple rechargeable batteries, configured to store and supply energy to power the UAV 12 for a desired duration and to be recharged by electricity output from or with the assistance of solar panels 18. Further, the battery could take various forms, using any of variety of rechargeable battery technologies suitable for powering the UAV 12. For example, the battery could be a lithium-sulphur (Li—S) rechargeable battery, which could be most efficient for use in a lightweight UAV, considering the high specific energy (energy per unit mass) of lithium and sulphur. Thus, UAV 12 could be equipped with a bank of lithium-sulphur batteries, which could be recharged by solar panels 18 and could output energy (e.g., voltage and current) as necessary to power motors 20 and other equipment of the UAV 12.

The battery 22 could be rated with an optimal discharge tolerance, defining a percentage of its total capacity (e.g., in kilowatt-hours) below which it should not be discharged, to help optimize its number of discharge/recharge cycles and its serviceable life. For example, the battery could have a manufacturer-recommended depth-of-discharge (DoD) of 80%, meaning that, to help optimize the serviceable life of the battery, the battery should not be discharged more than 80% of its total capacity. Discharging the battery more than this rated DoD could degrade the battery, reducing its ability to store energy and shortening the battery's serviceable life.

As suggested above, when flying a UAV such as UAV 12 in the stratosphere, particularly at high latitudes, the limited daylight hours and need for around-the-clock operation could pose a challenge. Maintaining a 24-hour on-station flight profile could require that the solar power system and rechargeable batteries be of sufficient size to collect enough energy during daylight to operate all avionics and payload systems through periods of no sunlight. As indicated, one way to help accomplish this is to drive the battery bank beyond its recommended discharge tolerance. For instance, if the battery 22 has a recommended discharge tolerance of 80%, one way to help the battery last throughout the nighttime hours is to let the battery discharge more than 80%, but of course less than 100%.

Unfortunately, however, as further noted above, discharging the battery beyond its recommended discharge tolerance could also significantly reduce the serviceable life of the battery. For instance, at its recommended discharge tolerance, the battery might be rated for 500 to 1,000 discharge/charge cycles, whereas when regularly discharged beyond its recommended discharge tolerance, the battery might support only about 30 discharge/charge cycles. As a result, this could require landing the UAV about every 30 days for battery replacement, which could be both costly and burdensome. Further, given a fleet of many such UAVs in operation (e.g., throughout a region of the stratosphere), the cost and burden would be multiplied.

Figure 2:
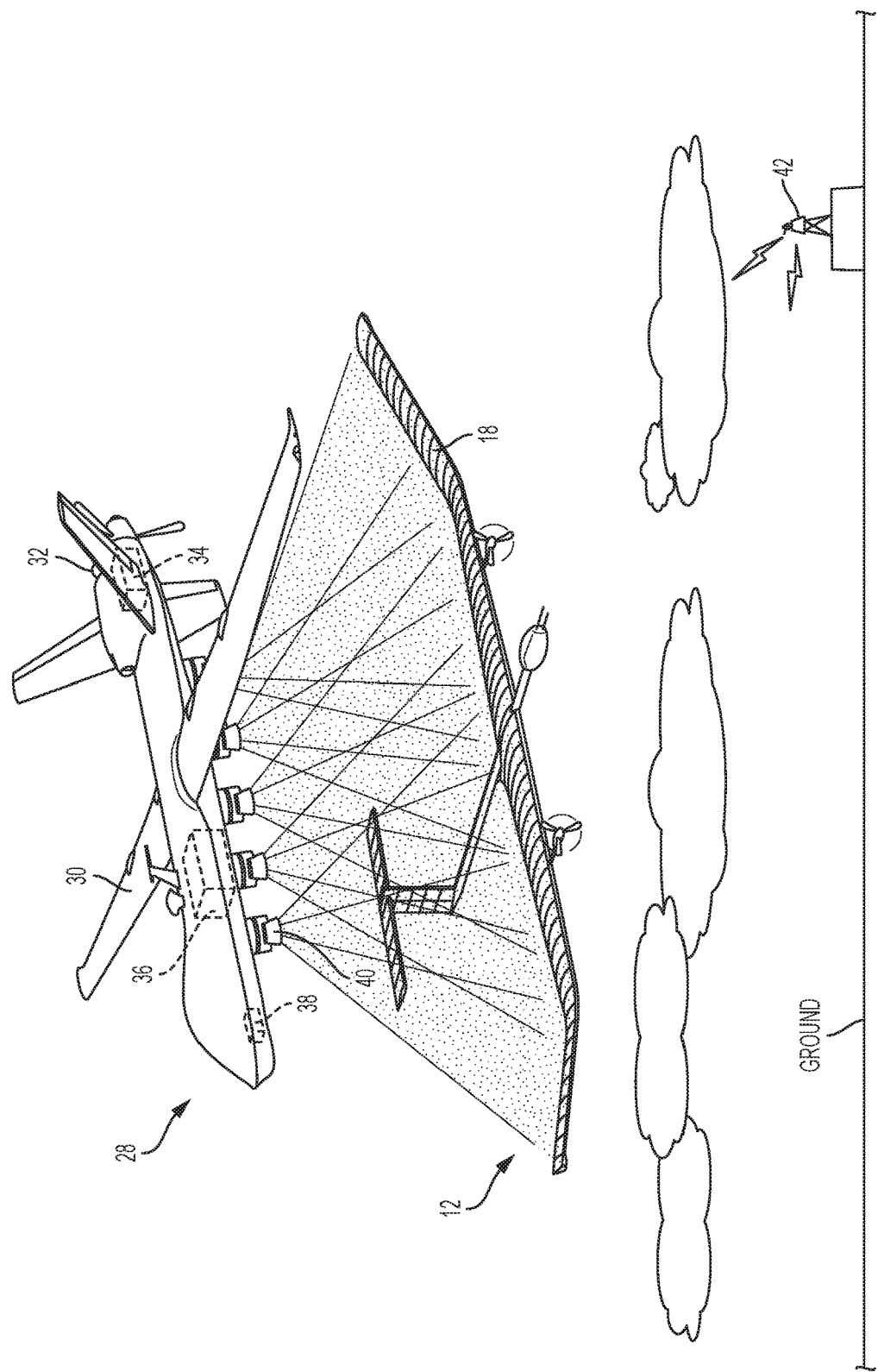
FIG. 2 is a simplified illustration of an arrangement in which a secondary UAV flies over a solar-powered UAV and illuminates the solar cells of the solar-powered UAV to help supplement the battery charge of the solar-powered UAV mid-flight.

FIG. 2 next depicts an arrangement in accordance with the present disclosure to help supplement the battery charge of the battery 22 while UAV 12 is in flight, by illuminating the solar panels 18 of the UAV 12 from a secondary UAV 28 flying in proximity to UAV 12.

The secondary UAV 28 is shown as another drone, optimally a powered, high-altitude capable drone equipped for low to medium speed flight. For example, the secondary UAV could be a propeller device such as the well-known Predator or another type of UAV configured to reach high altitudes similar to those of UAV 12. In particular, the secondary UAV 28 should be capable of flying to above the altitude at which UAV 12 flies and of establishing and maintaining a stable flight pattern (such as a figure-8 or circle) above UAV 12, to facilitate casting light down onto the solar cells of UAV 12 to help supplement the charge of battery 22. In an example implementation, the secondary UAV 28 might have a wingspan of about 50 feet and support operation at up to about 70,000 feet with a speed of around 120-130 miles per hour.

As shown in FIG. 2, for instance, the secondary UAV 28 has wings 30 and a propeller 32. Further, as shown in dashed lines, the secondary UAV 28 includes a power system 34, such as such as a starter/alternator, supplemental battery power, fuel tanks, and perhaps solar cells, cooperatively configured to power its avionics and payload. And the secondary UAV 28 includes a control system 36 for controlling operation of the secondary UAV 28, and a radio 38 for communicating with a ground-based control center and perhaps with other aircraft.

In accordance with the present disclosure, the secondary UAV 28 is then further equipped with a directional light source 40 for casting light onto the solar cells of UAV 12 while both UAVs are in flight. Optimally, the directional light source is positioned at the underside of UAV 28, to facilitate casting light down onto the solar cells of UAV 12 from a flight position above UAV 12. For instance, the directional light source could be mounted to the belly of the fuselage of UAV 28, perhaps retractable into the belly when not in use to facilitate efficient flight.

In a representative implementation, the directional light source could comprise multiple illuminator lights individually or cooperatively mounted to UAV 28 on one or more controllable multi-axial mounts (e.g., powered bi-axial tilt mounts). It is commonplace to mount cameras with bi-axial gimbal mounts to the underside of a UAV to facilitate in-flight imaging. For instance, the cameras could be within housings that are gimbal-mounted to the UAV fuselage. Per the present disclosure, the same basic structure could be used to mount floodlights to the underside of UAV 28, in this case to facilitate illuminating the solar panels of in-flight UAV 12. In particular, illuminator lights could be similarly provided within one or more housings gimbal-mounted to the UAV fuselage. For instance, a single gimbal mount could be provided for cooperatively steering a group of illuminator lights and/or multiple gimbal mounts could be provided for separately steering individual illuminator lights. The illuminator lights could then be dynamically directed to help illuminate the solar cells 18 of UAV 12.

The quantity and configuration of lights provided on UAV 28 could be selected based on the solar-panel configuration of UAV 12 and based on an evaluation of how close UAV 28 would fly to UAV 12 and while illuminating its solar panels and what the angle of incidence of the light might be on the solar panels. For example, the illuminator light color temperature could be selected to help maximize light absorption and power output from the solar panels 18. Further, the beamwidth and power or intensity of the illuminator lights could be selected and perhaps dynamically varied to help optimize illumination of the solar panels 18 given an expected distance between the UAVs and given the orientation of the UAVs and associated angle of incidence of the light. Optimally, the directional light source 40 would provide a cone of light to cover UAV 12 or at least to cover a meaningful portion of the solar panels 18 of UAV 12.

Preferably, the directional light source 40 would provide incoherent light, rather than coherent (e.g., laser) light, as incoherent light could illuminate the solar panels 18 of UAV 12 without the risk that coherent light might pose to other aircraft, satellites, or people on the ground. However, implementations using coherent light might be possible as well.

In an example implementation, the directional light source could use Light Emitting Diode (LED) lights, which could be relatively energy efficient and generate relatively low levels of heat. Alternatively or additionally, the directional light source could use other types of lights, such as incandescent, carbon-arc, halogen, xenon, fluorescent, high-intensity discharge, or others now known or later developed. Further, the UAV 28 could incorporate an auxiliary power source to help power the lights.

As noted above, secondary UAV 28 could establish a relatively stable flight pattern above in-flight UAV 12 and could use its directional light source to cast light on to the solar panels 18 of UAV 12 so as to help supplement the charge of battery 22 while UAV 12 is in flight. UAV 28 could operate autonomously and/or through control from a ground station or other control point. In an example implementation, for instance, UAV 28 could be at least partially remote-controlled from a ground station 42 (e.g., an operator-manned ground station), which could be in secure (e.g., encrypted) radio communication with both UAV 28 and UAV 12.

In a representative process, ground station 42 could track the geographic location (e.g., latitude, longitude, and altitude), battery charge level, and other operational parameters of UAV 12, through radio communication with control system 24 of UAV 12. To facilitate this, the control system 24 of UAV 12 could be configured to regularly track and transmit to the ground station 42 reports of its geographic location, battery charge level, and other operational parameters. In particular, the control system 24 could use a satellite-based position module (e.g., a Global Positioning System (GPS) module) or other mechanism for tracking its geographic location and could regularly report its location to the ground station. And control system 24 could further be coupled with a battery level meter (not shown) to track the level of battery charge (e.g., charge remaining, or extent of discharge) of battery 22 and could regularly report the battery level to the ground station.

Ground station 42 could then control operation of secondary UAV 28 based this information regarding UAV 12. Namely, based on the reported flight position of UAV 12, the ground station could direct UAV 28 to establish a stable flight pattern close enough to UAV 12 so that UAV 28 could cast light onto the solar panels of UAV 12 but that is a safe distance away from UAV 12 to avoid flight interference. For instance, the ground station could transmit to UAV 28 the geographic location coordinates of UAV 12, and UAV 28 could then programmatically fly to and establish a flight pattern suitably above that location. Further, as the location of UAV 12 changes during flight, the ground station could provide UAV 28 with an updated report of the location of UAV 12 and could direct UAV 28 to dynamically adjust its flight pattern location accordingly to stay suitably above the location of UAV 12.

The safe distance between UAV 28 and UAV 12 could depend on the configuration of both UAVs, to help ensure an undisrupted flight envelope around UAV 12 and an undisrupted flight envelope around UAV 28. Further, the distance between UAV 28 and UAV 12 could depend on the configuration of the directional light source 40, such as the intensity and beamwidth of the light provided to illuminate the solar panels of UAV 12. The specific distance and locations could thus be matters of design choice based on the facts. For instance, given a wingspan of about 110 feet and an illumination angle of about 20 degrees, the distance of separation could be about 84 feet.

Further, based on the reported battery level of battery 22 of UAV 12, the ground station 42 could direct UAV 28 to cast light onto the solar panels of UAV 12 to help supplement the battery charge mid-flight. To facilitate this, the ground station could direct UAV 28 to power on its directional light source 40 and to steer the light source toward the location of UAV 12.

Based on the location of UAV 28 and the location of UAV 12, and further based on other flight parameters of the two UAVs, the ground station or UAV 28 could compute a direction to point directional light source 40, and UAV 28 could accordingly point the directional light source 40 in the computed direction so as to cast light onto UAV 12 and specifically onto the solar panels of UAV 12. For instance, the control system of UAV 28 could dynamically interact with and control one or more controllable multi-axial mounts of the directional light source 40, to dynamically steer the light source so as to point in the computed direction to UAV 12. And as the locations of the UAVs changes during flight, the ground station or UAV 28 could update the computed direction and could dynamically adjust the direction that light source 40 is pointed so as to continue to cast light onto the solar panels of UAV 12.

While UAV 28 and UAV 12 are both in flight, UAV 28 could thus cast light onto the solar panels of UAV 12, and the solar panels could convert the light into electricity for supplementing the charge of battery 22.

A goal in this process could be to help avoid letting battery 22 discharge beyond its recommended discharge tolerance, so as to help extend the serviceable life of battery 22. To facilitate this, the ground station 42 could compute a target level of charge (e.g., a recharge level) of battery 22, based on factors such as the current time of day and historical data regarding sunset, sunrise, and a typical discharge rate of battery 22, and the ground station 42 could control how long UAV 28 continues to illuminate the solar cells of UAV 12 to help recharge battery 22 to a desired extent.

In particular, the ground station 42 could determine a target level to which the charge of battery 22 of UAV 12 should be raised, such that, upon discontinuing the illumination from UAV 28, the battery could likely continue to provide required power without discharging beyond its recommended discharge tolerance before sunrise. As UAV 28 illuminates the solar panels of UAV 12, the ground station 42 could then monitor the reported battery charge level of UAV 12 and determine when the battery charge level reaches the computed target level. And upon detecting that the battery charge level has reached the target level, the ground station 42 could direct UAV 28 to stop illuminating the solar cells of UAV 12, and UAV 28 could responsively turn off its directional light source 40, thus discontinuing the illumination of UAV 12. UAV 12 could then in theory continue to fly throughout the night with reduced risk of its battery charge dropping below its recommended discharge tolerance.

Figure 3:
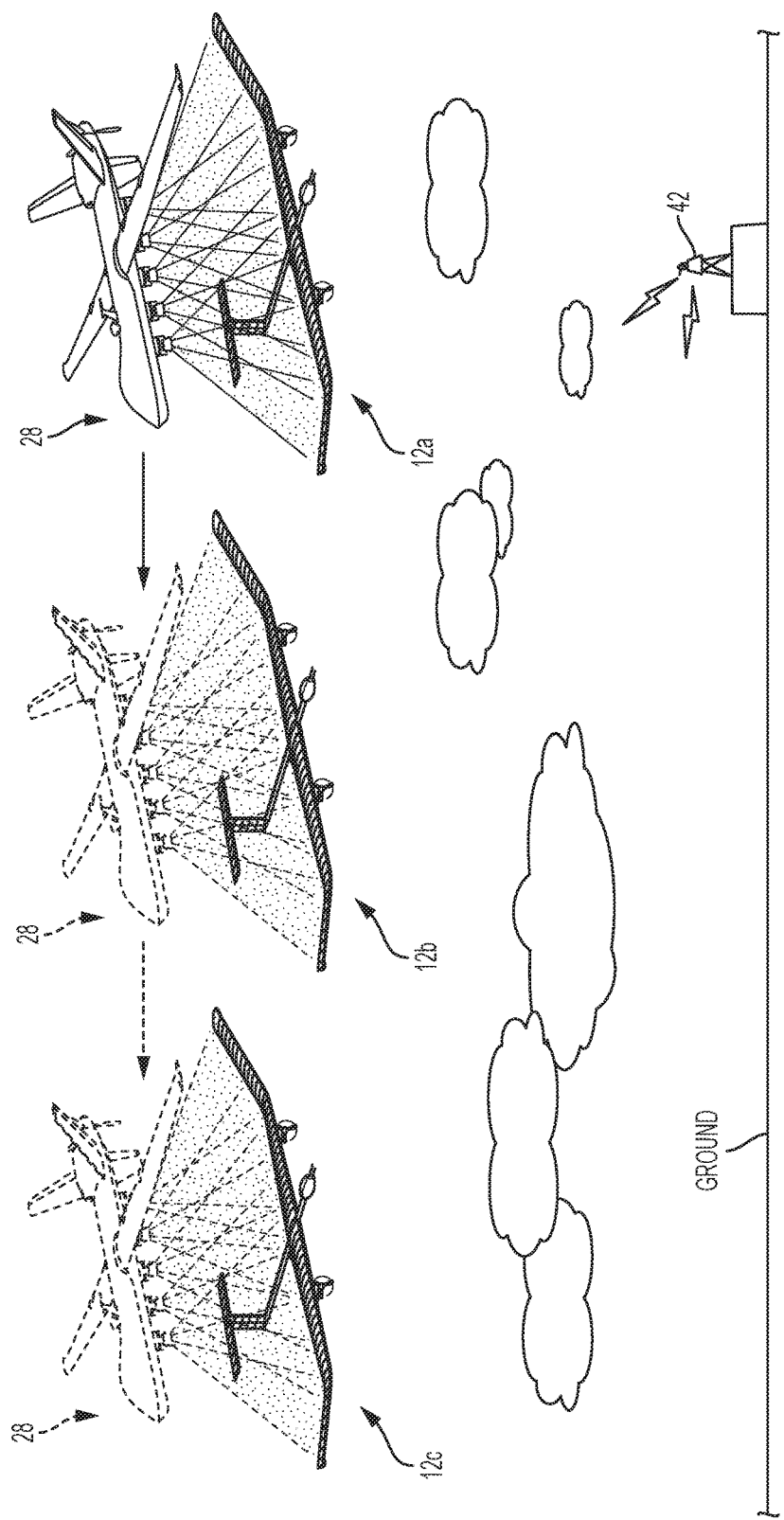
FIG. 3 is a simplified illustration of an arrangement in which a secondary UAV illuminates solar cells of multiple solar-powered UAVs mid-flight in a single nighttime mission.

In an example implementation, UAV 28 could operate to illuminate multiple in-flight UAVs 12 (e.g., a fleet of UAVs 12) in the course of a single nighttime mission, so as to help supplement the battery charge (or charge of other energy-storage device) of each in-flight UAV 12. FIG. 3 illustrates this process by way of example. In operation, under control of the ground station 42 or through other means, UAV 28 could initially take off with enough time to reach its operational altitude and position proximate to a first UAV 12*a* before dusk. UAV 28 could then power on its directional light source and illuminate the solar cells of that first UAV 12*a*, so as to help supplement the battery charge of the first UAV 12. Once the battery charge of that first UAV 12*a* reaches a threshold level, UAV 28 could then turn off its directional light source and fly to a second UAV 12*b*, where UAV 28 could then repeat the process before then proceeding to a third UAV 12*c*, and so forth. This process could then continue throughout the night. And after sunrise, UAV 28 could return to its origin airfield to be serviced before its next night of operations.

Figure 4:
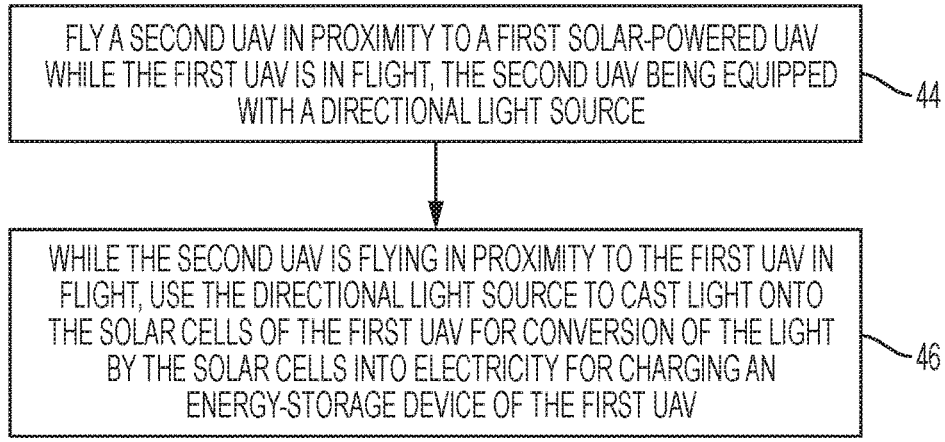
FIG. 4 is a flow chart depicting a method that could be carried out in accordance with the disclosure.

FIG. 4 is a flow chart depicting a method that could be carried out in accordance with the discussion above, to facilitate charging an energy-storage device (e.g., battery) of a first UAV while the first UAV is in flight, where the first UAV is equipped with solar cells that convert light into electricity for charging the energy-storage device. As shown in FIG. 4, at block 44, the method includes flying a second UAV in proximity to the first UAV while the first UAV is in flight, where the second UAV is equipped with a directional light source. And at block 46, the method includes, while the second UAV is flying in proximity to the first UAV in flight, using the directional light source to cast light onto the solar cells of the first UAV for conversion of the light by the solar cells into electricity for charging the energy-storage device.

This method could be carried out by the second UAV, possibly through remote-control interaction with a ground station as discussed above and/or in other ways, and could be carried out with the first UAV and second UAV flying in the stratosphere or at another altitude, at night. For example, a ground station could control flying of the second UAV into a flight pattern safely above the first UAV and could control the second UAV's use of the directional light source to illuminate the solar cells of the first UAV. Alternatively, the second UAV could operate more autonomously and/or through communication with the first UAV, to determine the location of the first UAV, to enter into a flight pattern safely above the first UAV, and to use its directional light source to illuminate the solar cells of the first UAV.

In line with the discussion above, the light that is cast from the second UAV onto the solar cells of the first UAV could be incoherent light, such as light generated by a bank of LED lamps for instance. Further, the energy-storage device of the first UAV could comprise a rechargeable battery such as a lithium-sulphur battery (e.g., a bank of such batteries) for instance.

In addition, the first UAV and second UAV could each take various forms as discussed above. For example, the first UAV could be a HAPS platform and/or other balloon system, drone, or other aircraft. And likewise, the second UAV could be a drone or other sort of aircraft. And flying the second UAV in proximity to the first UAV when the first UAV is in flight could comprise flying the second UAV above the first UAV while the first UAV is in flight, with the second UAV being positioned at safe distance from the first UAV but close enough to the first UAV to cast light down onto the solar cells of the first UAV.

Still further, as also discussed above, the directional light source could be mounted to the second UAV with at least one controllable multi-axial mount, in which case using the directional light source to cast light onto the solar cells of the first UAV could involve controlling the controllable multi-axial mount(s) to direct light from the directional light source toward the solar cells of the first UAV. For instance, a control system of the second UAV, possibly under direction of a ground station or the like, could programmatically and dynamically control the mount(s) to point the directional light source at the first UAV so as to illuminate the solar cells of the first UAV.

In addition, as also discussed above, the act of flying the second UAV in proximity to the first UAV while the first UAV is in flight could involve using satellite-based positioning to determine a location of the first UAV, and flying the second UAV in proximity to the determined location of the first UAV. And the act of using the directional light source to cast light onto the solar cells of the first UAV while the first UAV is in flight could involve computing a beam direction from the second UAV to the first UAV and pointing the directional light source in the computed beam direction. And as the second UAV and first UAV continue to fly, the method could further involve updating the beam direction from the second UAV to the first UAV and adjusting the directional light source to point in the updated beam direction, so as to continue to illuminate the solar cells of the second UAV.

Yet further, as also discussed above, the method could additionally involve detecting when a charge of the energy-storage device of the first UAV increases to a threshold level (e.g., when the battery is recharged to a determined threshold or target extent). And the method could involve, responsive to detecting the charge of the energy-storage device increasing (e.g., having increased) to the threshold level, (i) flying the second UAV from being in proximity to the first UAV in flight to being in proximity to a third UAV in flight and (ii) while the second UAV is flying in proximity to the third UAV in flight, using the directional light source to cast light onto solar cells of the third UAV for conversion of the light by the solar cells of the third UAV into electricity for charging an energy-storage device (e.g., battery) of the third UAV.

In addition, as discussed above, the method could involve operating a ground-based control center in communication with at least the first UAV and the second UAV. The ground-based control center could then control at least some aspects of flying of the second UAV. And the act of detecting when the charge of the energy-storage device of the first UAV increases to the threshold level could involve the ground-based control center receiving from the first UAV a report indicating that charge of the energy-storage device has increased to the threshold level.

Figure 5:
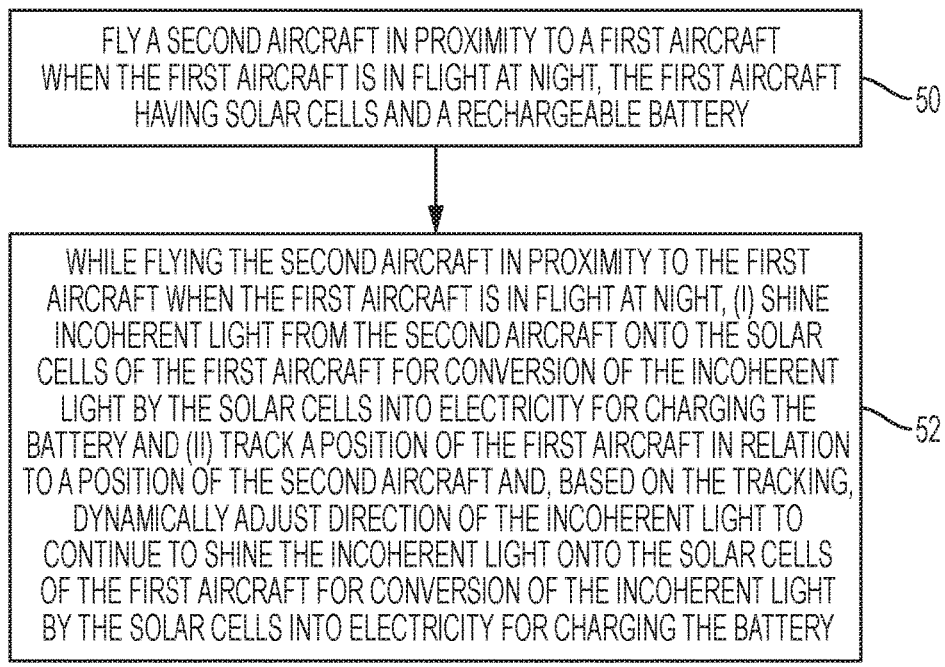
FIG. 5 is another flow chart depicting a method that could be carried out in accordance with the disclosure.

FIG. 5 is another flow chart depicting a method that could be carried out in accordance with the discussion above, to facilitate charging a battery of a first aircraft in flight at night, where the first aircraft is equipped with solar cells that convert light into electricity for charging the battery. As shown in FIG. 5, at block 50, the method includes flying a second aircraft in proximity to the first aircraft when the first aircraft is in flight at night. Further, at block 52, the method includes, while flying the second aircraft in proximity to the first aircraft when the first aircraft is in flight at night, (i) shining an incoherent light from the second aircraft onto the solar cells of the first aircraft for conversion of the incoherent light by the solar cells into electricity for charging the battery and (ii) tracking a position of the first aircraft in relation to a position of the second aircraft and, based on the tracking, dynamically adjusting direction of the incoherent light to continue to shine the incoherent light onto the solar cells of the first aircraft for conversion of the incoherent light by the solar cells into electricity for charging the battery.

Figure 6:
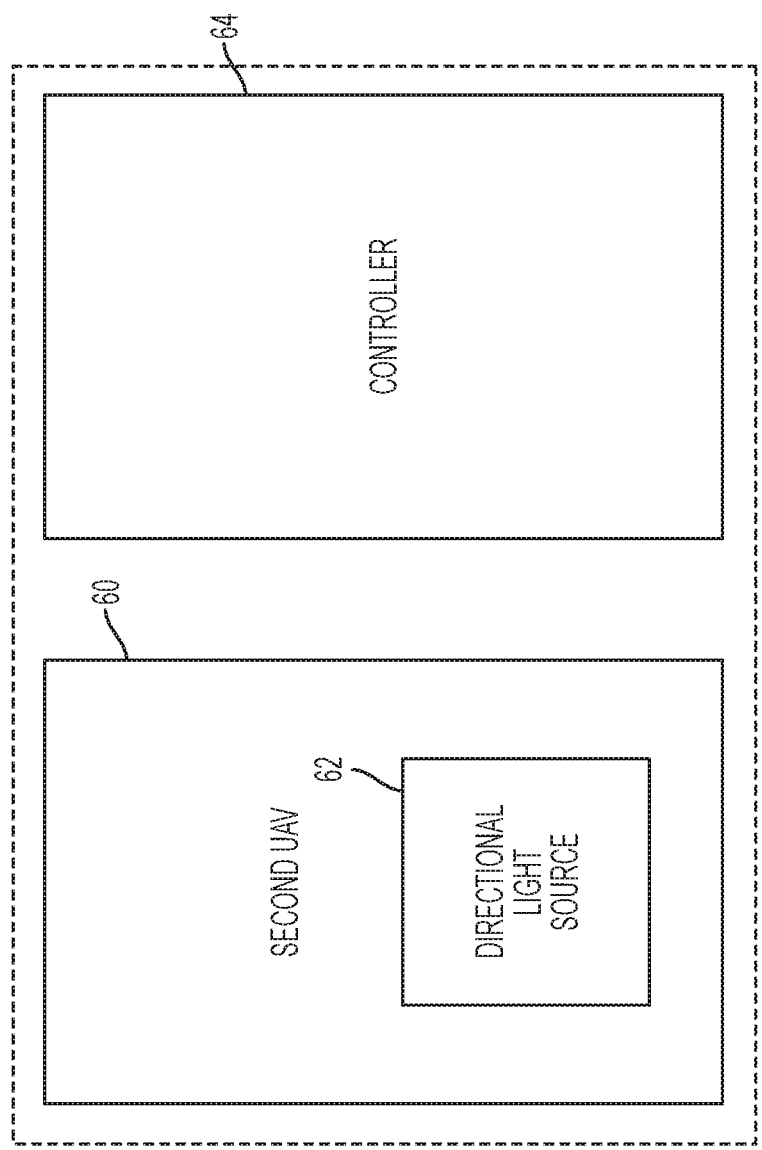
FIG. 6 is a simplified block diagram of a system for carrying out features in accordance with the disclosure.

Finally, FIG. 6 is a simplified block diagram depicting a system for charging a battery of a first UAV while the first UAV is in flight, where the first UAV is equipped with solar cells that convert light into electricity for charging the battery. As shown in FIG. 6, the system includes a second UAV 60 equipped with a directional light source 62, and the system further includes a controller 64 configured (i) to cause the second UAV to fly in proximity to the first UAV while the first UAV is in flight and (ii) while the second UAV is flying in proximity to the first UAV in flight, to cause the directional light source to cast incoherent light onto the first UAV for conversion of the light by the solar cells into electricity for charging the battery.

In practice, as indicated by the dashed lines in the figure, controller 64 could be integrated at least in part with the second UAV, as part of a control system of the second UAV for instance. Alternatively or additionally, the controller 64 could be provided at or as a ground-based control center in remote-control communication with the second UAV 60. For instance, through radio communication with the second UAV, the ground-based control center could command the second UAV to fly in a flight-pattern proximate to the first UAV and to cast the incoherent light onto the first UAV (onto the solar cells of the first UAV).

In line with the discussion above, the directional light source 62 could include a bank of multiple lamps mounted to an underside of the second UAV by at least one controllable multi-axial mount. Further, the controller 64 could be configured to cause the second UAV to fly above the first UAV at a safe distance from the first UAV, with the distance being short enough to allow the incoherent light from the second UAV to reach the solar cells of the first UAV for charging the battery. And the controller could be configured to track a flight position of the first UAV in relation to a flight position of the second UAV and, based on the tracking, to dynamically redirect the directional light source to continue to cast incoherent light onto the first UAV in flight for conversion of the light by the solar cells into electricity for charging the battery.

Moreover, in line with the discussion above, the controller could be configured to detect when charge of the battery of the first UAV increases to a threshold level and, in response to the detecting, to cause the directional light source to discontinue casting the incoherent light onto the first UAV, possibly then causing the second UAV to then fly to a position where it can next illuminate solar cells of a third in-flight UAV.

Note that controller 64, as well as various other control systems discussed above, could take any of various forms. For instance, the controller and other control systems could each comprise one or more processing units (e.g., microprocessors), non-transitory data storage (e.g., magnetic, optical, or flash storage), and program instructions stored in the data storage and executable by the processing unit(s) to carry out the described operations.

Exemplary embodiments have been described above. Those skilled in the art will understand, however, that changes and modifications may be made to these embodiments without departing from the true scope and spirit of the invention.

We claim:

1. A method of charging an energy-storage device of a first unmanned aerial vehicle (UAV) while the first UAV is in flight, wherein the first UAV is equipped with solar cells that convert light into electricity for charging the energy-storage device, the method comprising:
flying a second UAV in proximity to the first UAV while the first UAV is in flight, wherein the second UAV is equipped with a directional light source; and
while the second UAV is flying in proximity to the first UAV in flight, using the directional light source to cast light onto the solar cells of the first UAV to help charge the energy-storage device of the first UAV.

2. The method of claim 1, wherein the light is incoherent.

3. The method of claim 2, wherein the energy-storage device comprises a battery.

4. The method of claim 2, wherein the directional light source comprises a bank of multiple lamps.

5. The method of claim 2, wherein the first UAV is a High Altitude Pseudo-Satellite (HAPS) platform.

6. The method of claim 2, wherein the first UAV is selected from the group consisting of a balloon system and a drone.

7. The method of claim 2, wherein flying the second UAV in proximity to the first UAV while the first UAV is in flight comprises flying the second UAV above the first UAV while the first UAV is in flight.

8. The method of claim 2, wherein the directional light source is mounted to the second UAV with at least one controllable multi-axial mount, and wherein using the directional light source to cast light onto the solar cells of the first UAV comprises controlling the at least one controllable multi-axial mount to direct light from directional light source toward the solar cells of the first UAV.

9. The method of claim 2,
wherein flying the second UAV in proximity to the first UAV while the first UAV is in flight comprises using satellite-based positioning to determine a location of the first UAV and flying the second UAV in proximity to the determined location of the first UAV, and
wherein using the directional light source to cast light onto the solar cells of the first UAV while the first UAV is in flight comprises computing a beam direction from the second UAV to the first UAV and pointing the directional light source in the computed beam direction.

10. The method of claim 9, further comprising, as the second UAV flies and the first UAV flies:
updating the beam direction from the second UAV to the first UAV; and
adjusting the directional light source to point in the updated beam direction.

11. The method of claim 2, further comprising:
detecting when charge of the energy-storage device increases to a threshold level; and
responsive to the detecting, (i) flying the second UAV from being in proximity to the first UAV in flight to being in proximity to a third UAV in flight and (ii) while the second UAV is flying in proximity to the third UAV in flight, using the directional light source to cast light onto solar cells of the third UAV for conversion of the light by the solar cells of the third UAV into electricity for charging an energy-storage device of the third UAV.

12. The method of claim 11, further comprising operating a ground-based control center in communication with at least the first UAV and the second UAV,
wherein the ground-based control center controls flying of the second UAV, and
wherein detecting when the charge of the energy-storage device increases to the threshold level comprises receiving by the ground-based control center from the first UAV a report indicating that charge of the energy-storage device has increased to the threshold level.

13. The method of claim 2, carried out in the stratosphere at night.

14. A method of charging a battery of a first aircraft in flight at night, wherein the first aircraft is equipped with solar cells that convert light into electricity for charging the battery, the method comprising:
flying a second aircraft in proximity to the first aircraft when the first aircraft is in flight at night; and
while flying the second aircraft in proximity to the first aircraft when the first aircraft is in flight at night, (i) shining an incoherent light from the second aircraft onto the solar cells of the first aircraft for conversion of the incoherent light by the solar cells into electricity for charging the battery and (ii) tracking a position of the first aircraft in relation to a position of the second aircraft and, based on the tracking, dynamically adjusting direction of the incoherent light to continue to shine the incoherent light onto the solar cells of the first aircraft for conversion of the incoherent light by the solar cells into electricity for charging the battery.

15. A system for charging a battery of a first unmanned aerial vehicle (UAV) while the first UAV is in flight, wherein the first UAV is equipped with solar cells that convert light into electricity for charging the battery, the system comprising:
a second UAV equipped with a directional light source; and
a controller configured (i) to cause the second UAV to fly in proximity to the first UAV while the first UAV is in flight and (ii) while the second UAV is flying in proximity to the first UAV in flight, to cause the directional light source to cast incoherent light onto the first UAV for conversion of the light by the solar cells into electricity for charging the battery.

16. The system of claim 15, wherein the controller comprises a ground-based control center in communication with the second UAV, and wherein the ground-based control center commands the second UAV to fly in a flight-pattern proximate to the first UAV and to cast the incoherent light onto the first UAV.

17. The system of claim 15, wherein the directional light source comprises a bank of multiple lamps mounted to an underside of the second UAV by at least one controllable multi-axial mount.

18. The system of claim 15, wherein the controller is configured to cause the second UAV to fly above the first UAV at a safe distance from the first UAV, the distance being short enough to allow the incoherent light from the second UAV to reach the solar cells of the first UAV for charging the battery.

19. The system of claim 15, wherein the controller is configured to track a flight position of the first UAV in relation to a flight position of the second UAV and, based on the tracking, to dynamically redirect the directional light source to continue to cast incoherent light onto the first UAV in flight for conversion of the light by the solar cells into electricity for charging the battery.

20. The system of claim 15, wherein the controller is configured to detect when charge of the battery increases to a threshold level and, in response to the detecting, to cause the directional light source to discontinue casting the incoherent light onto the first UAV.

* * * * *